Feb. 23, 1937.   F. W. JACKMAN   2,071,344
METHOD OF MAKING A TRANSLUCENT PICTURE PROJECTION SCREEN
Original Filed Sept. 7, 1932
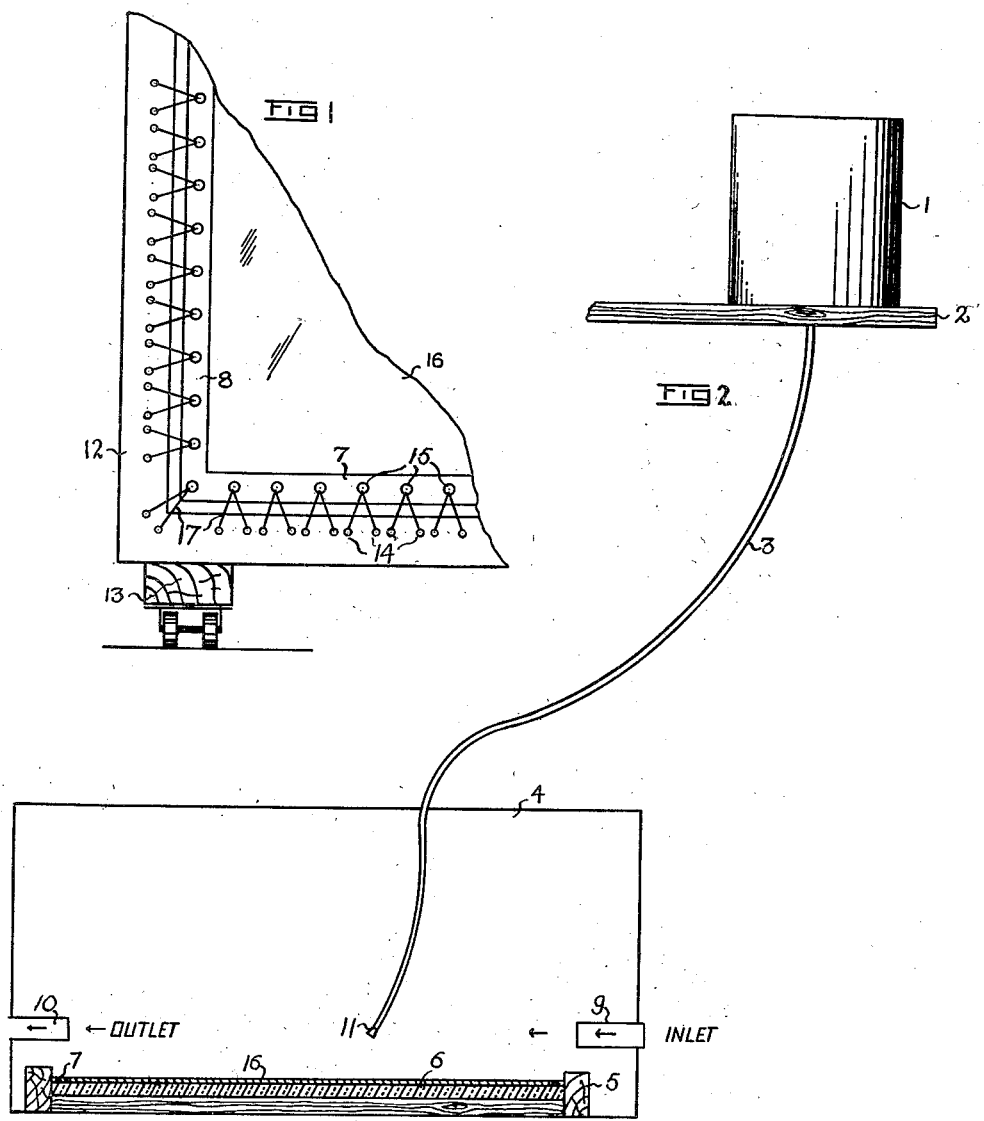
INVENTOR.
FRED W. JACKMAN.
BY
ATTORNEY Patented Feb. 23, 1937

2,071,344

UNITED STATES PATENT OFFICE 2,071,344

METHOD OF MAKING A TRANSLUCENT PICTURE PROJECTION SCREEN

Fred W. Jackman, Beverly Hills, Calif., assignor to Warner Bros. Pictures, Inc., New York, N. Y., a corporation of Delaware Application September 7, 1932, Serial No. 631,964
Renewed June 5, 1936

7 Claims. (Cl. 18—57)

This invention relates to a translucent motion picture screen, more particularly to a screen which is not fragile, and to a method of making the same.

It has heretofore been proposed to employ a glass screen having a ground surface, on which a picture or motion pictures are projected, in order that such pictures may be viewed or photographed from the opposite side of the screen. A glass screen has several disadvantages, in that it is expensive, heavy and dangerous to move, (due to possible injury to workmen).

One object of the present invention is to avoid the expense, inconvenience, and danger of a fragile translucent screen such as a ground glass screen.

This is accomplished by spraying a liquid translucent material, such as a solution of cellulose acetate onto an uneven or roughened flat surface, a multiple coating of the solution is applied to the surface, each coating being permitted to dry. After the final coating has dried, a unitary sheet of flexible translucent material may be stripped from the base on which it was formed, thereby forming a non-fragile translucent screen, which may be manufactured economically of any desired size.

In order to provide a convenient arrangement for supporting a large sheet of cellulose acetate, so made, substantially in a plane without wrinkles, preferably the coatings of cellulose acetate referred to above are sprayed onto a suitable border, such as strips of canvas having eyelets therein for attachment to a frame.

A further object of the invention is to prevent the production of air bubbles in the cellulose acetate sheet as it is applied to the base. This is accomplished partly by applying the solution of cellulose acetate to the base solely under gravitational pressure, in the absence of air pressure, and partly by spraying the solution onto the base in dry or conditioned air. The latter expedient prevents the formation of a porous texture, which would result if there was any moisture in the solution.

For further details of this invention reference may be made to the drawing, wherein:

Fig. 1 is a fragmentary side elevation of a screen mounted in a supporting frame.

Fig. 2 is a side elevation partly in cross section of a preferred arrangement of parts, used to prepare a screen according to this invention.

In the preparation of a cellulose acetate screen, it is very necessary that the cellulose acetate be free of bubbles or impurities, and so cellulose acetate sheets are cut up into small strips or powdered, and to each 4.2 grams of the cellulose acetate are added 100 cc. of C. P. acetate, and 20 cc. of 80 to 90% glacial acetic acid—this mixture is encased in a drum which is rotated for the length of time necessary to insure a complete solution of the cellulose acetate. The drum 1 (Fig. 2) containing the cellulose acetate solution is then hoisted to a height where its gravitational pressure is approximately 15 lbs. per square inch at ground level. Drum 1 is supported by any suitable means, such as a beam 2. A tube 3 which is preferably of pure surgical rubber, in order that the cellulose acetate solution will not chemically react with it during its passage therethrough, is attached to the drum 1. The tube 3 passes through a wall 4 in a room, the floor of which is covered by a suitable frame 5 encasing a desired base 6 which may be of sand blasted glass. It is well known that the sand blasted surface of glass comprises an irregular array of minute indentations. Around the border or edges of this base are placed strips of canvas, 7 and 8 to form the edges of the cellulose acetate sheet 16. An inlet valve 9 serves to supply especially conditioned air to the chamber and an outlet valve 10 exhausts the air and insures a continuous flow of conditioned air across the surface of the base 6.

In the operation of this device a nozzle 11 closing the end of the tube 3 is opened and a coating of cellulose acetate solution is sprayed onto the base 6 to integrally unite the sheet thus produced with the edge 7. This coating is allowed to dry thoroughly in the conditioned air which flows through the chamber. When this is accomplished a second coating is applied and the same procedure followed. Twenty to thirty coats of the solution are applied, each being allowed to dry separately. The sheet of cellulose acetate, and its integrally united edge 7, so formed are then bodily stripped from off the base 6 and mounted in the frame 12, (Fig. 1). The frame 12 is supported for mobility by means of any suitable rollers 13. A series of pins 14 are placed along the edges of the frame 12 and are resiliently connected by means of springs or rubber bands 17 to a series of eyelets 15 in the canvas border 7 and 8 along the edges of the screen 16. By using this form of mounting the screen will always remain taut without any wrinkles therein. This form of mounting is disclosed and claimed in my application, Serial No. 637,292, filed October 11, 1932.

Thus it will be seen that a screen is provided which is flexible, light in weight and inexpensive to make. Besides these advantages, it has been found by photometer readings that, other factors being equal, the intensity of illumination of a screen made by this process, and on which a motion picture is projected from behind the screen, is approximately 100% greater than the illumination of a treated glass screen. Therefore, a projector lamp of less intensity may be used thereby greatly reducing the amount of heat that is emitted from the projector onto the film or slide to be projected. Due to its acetate base, a screen of cellulose material formed by this process is practically non-inflammable and the risk of fire is reduced to a minimum.

While there is herein described one method of producing a screen, it is to be understood that the quantity of the ingredients and the various solvents may be changed without departing from the invention herein disclosed.

Having thus described the invention what is claimed as new and desired to secure by Letters Patent is:

1. The method of making a translucent screen adapted to receive projected pictures which comprises applying a solution of a translucent material to cover an uneven surface comprising an irregular array of minute indentations, allowing an imperforate layer of said solution to dry, and stripping the sheet thus produced from said surface.

2. The method of making a translucent screen adapted to receive projected pictures which comprises spraying a plurality of coats of a solution of cellulose material to cover a roughened surface comprising an irregular array of minute indentations, allowing each coat to dry, thus forming an imperforate sheet adapted to receive projected pictures and stripping the sheet thus produced from said surface.

3. The method of making a translucent screen adapted to receive projected pictures which comprises spraying a solution of cellulose material under liquid pressure free from air pressure onto a roughened surface comprising an irregular array of minute indentations and permitting the sprayed material to dry, and stripping the sheet thus produced from said surface.

4. The method of making a translucent screen with a reinforced edge which comprises placing a reinforced edge adjacent a roughened surface, spraying a solution of translucent material on said edge and onto said surface, allowing said solution to dry and stripping the transparent sheet with its integrally united edge thus produced from said surface.

5. The method of making a translucent screen with a reinforced edge, which comprises placing a reinforcing edge adjacent a roughened surface, spraying a plurality of coats of a solution of cellulose material on said surface and on said edge to integrally unite said edge with the sprayed material on said surface, allowing each coat to dry, and stripping the sheet with its reinforcing edge thus produced from said surface.

6. The method of making a translucent projection screen which comprises spraying a solution of translucent material on a roughened surface comprising an irregular array of minute indentations, to form an imperforate sheet adapted to receive projected pictures, performing said spraying in the presence of conditioned air, allowing said solution to dry, and stripping the sheet thus produced from said surface.

7. The method of making a translucent projection screen with a reinforcing edge, comprising forming a sheet of cellulose material on a rough surface, and integrally uniting a reinforcing edge therewith with cellulose material.

FRED W. JACKMAN.